(12) United States Patent
Kim et al.

(10) Patent No.: US 8,921,453 B2
(45) Date of Patent: Dec. 30, 2014

(54) NONAQUEOUS INK COMPOSITION FOR INK JET AND METHOD OF MANUFACTURING INK COMPRISING THE SAME

(75) Inventors: Jun Young Kim, Gyunggi-do (KR); Jae Woo Joung, Gyunggi-do (KR); Sung Nam Cho, Gyunggi-do (KR); Ha Yoon Song, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 496 days.

(21) Appl. No.: 12/656,987

(22) Filed: Feb. 22, 2010

(65) Prior Publication Data

US 2011/0065851 A1 Mar. 17, 2011

(30) Foreign Application Priority Data

Sep. 15, 2009 (KR) ........................ 10-2009-0087088

(51) Int. Cl.
| | | |
|---|---|---|
| *B32B 7/12* | (2006.01) | |
| *C08G 73/10* | (2006.01) | |
| *C08K 5/00* | (2006.01) | |
| *C08K 5/06* | (2006.01) | |
| *C08K 5/10* | (2006.01) | |
| *C08K 5/16* | (2006.01) | |
| *C08K 5/17* | (2006.01) | |
| *C08K 5/103* | (2006.01) | |
| *C09D 5/00* | (2006.01) | |
| *C09D 11/00* | (2014.01) | |
| *C09D 11/10* | (2014.01) | |
| *C09J 7/02* | (2006.01) | |
| *H01B 3/44* | (2006.01) | |
| *C09D 11/328* | (2014.01) | |

(52) U.S. Cl.
CPC .................................. *C09D 11/328* (2013.01)
USPC ........... 523/160; 523/161; 524/186; 524/236; 524/256; 524/317; 524/366; 524/376; 524/377

(58) Field of Classification Search
USPC .......... 523/160, 161; 524/186, 236, 256, 317, 524/366, 376, 377
See application file for complete search history.

(56) References Cited

U.S. PATENT DOCUMENTS

| | | | | |
|---|---|---|---|---|
| 7,648,570 | B2 * | 1/2010 | Deroover ................... | 106/31.77 |
| 2006/0281027 | A1 | 12/2006 | Makino et al. | |
| 2009/0075036 | A1 | 3/2009 | Itano et al. | |

FOREIGN PATENT DOCUMENTS

| | | |
|---|---|---|
| JP | 8-157758 | 6/1996 |
| JP | 2003-127525 | 5/2003 |
| JP | 2004-300280 | 10/2004 |
| JP | 2005-248178 | 9/2005 |
| JP | 2007-9105 | 1/2007 |
| JP | 2007-9192 | 1/2007 |
| JP | 2007-197675 | 8/2007 |
| JP | 2008-505774 | 2/2008 |
| JP | 2008-509231 | 3/2008 |
| JP | 2008-266537 | 6/2008 |
| JP | 2008-184567 | 8/2008 |
| JP | 2008-297324 | 12/2008 |
| JP | 2010-2452 | 1/2010 |
| JP | 2010-107813 | 5/2010 |
| JP | 2010-270220 | 12/2010 |
| KR | 10-2006-0097026 | 9/2006 |
| WO | 2005/035673 A1 | 4/2005 |
| WO | WO 2005/115089 A2 | 12/2005 |
| WO | WO 2005/115761 A2 | 12/2005 |

OTHER PUBLICATIONS

Korean Office Action issued Jun. 27, 2011 in corresponding Korean Patent Application 10-2009-0087088.
Japanese Office Action for Application No. 2009-288084 issued Jul. 31, 2012.
Japanese Office Action issued Jul. 30, 2013 in corresponding Japanese Application No. 2009-288084.

* cited by examiner

*Primary Examiner* — Patrick Niland

(57) ABSTRACT

A nonaqueous ink composition for an ink jet and a method of manufacturing ink comprising the same are provided. The nonaqueous ink composition for the ink jet includes: a glycol ether acetate solvent represented by a specific chemical formula; and a polypropylene glycol binder represented by a specific chemical formula. The nonaqueous ink composition for an ink jet has dynamic viscoelasticity obtained by a chemical interaction between the solvent and the binder, exhibits excellent print quality and is capable of high-speed printing.

9 Claims, No Drawings

NONAQUEOUS INK COMPOSITION FOR INK JET AND METHOD OF MANUFACTURING INK COMPRISING THE SAME

CROSS-REFERENCE TO RELATED APPLICATIONS

This application claims the priority of Korean Patent Application No. 10-2009-0087088 filed on Sep. 15, 2009, in the Korean Intellectual Property Office, the disclosure of which is incorporated herein by reference.

BACKGROUND OF THE INVENTION

1. Field of the Invention

The present invention relates to a nonaqueous ink composition for an ink jet and a method of manufacturing ink comprising the same, and more particularly, to a nonaqueous ink composition for an ink jet, which features excellent print quality and is capable of high-speed printing, and a method of manufacturing ink comprising the same.

2. Description of the Related Art

Among ink jet printing methods, non-impact printing is classified into continuous ink jet systems and drop-on demand (DOD) systems.

In continuous ink jet systems, when ink is emitted in a continuous stream, the direction of the ink emitted is adjusted by changing an electromagnetic field. In DOD systems, ink is broken up into fine droplets, and the droplets are expelled.

DOD systems are classified into thermal-bubble ink jet systems and piezoelectric ink jet systems. Thermal-bubble ink jet systems use the pressure produced by bursting bubbles of ink heated in a narrow flow path to fire the ink. In piezoelectric systems, electricity passing through piezoelectric elements causes physical distortions in the elements, in order to fire the ink. Piezoelectric systems use a relatively simple mechanism and can form high-quality images with high precision, and thus have recently been extensively applied to printed electronic circuit patterns and the like for industrial applications, as well as for home printers.

Recently, a piezoelectric ink jet printing technique requires high-frequency response in ink, for the purpose of increasing productivity per unit time through high precision and fast printing speeds. Therefore, more importance has been given to an ink jet which is capable of stably ejecting droplets, even at a high driving frequency of the head, which is essential for the enhancement of an ink jet apparatus and the realization of high-speed printing.

In particular, with the increase in the driving frequency of the head, ejected droplets easily form a satellite or a bent ligament. This phenomenon may lead to the printing of portions other than of ink droplet impact points, thereby having an adverse effect on the formation of a high-precision image.

Due to these factors, various attempts in the development of ink compositions ensuring ejection stability are ongoing.

There has been proposed an ink for an ink jet capable of high-speed printing, the ink containing a mixture of a glycol ether solvent and one type of polyhydric alcohol (Japanese Unexamined Patent Application Publication No. 2008-266537). Such proposed compositions use a large amount of diethylene glycol ethyl ether, diethylene glycol butyl ether, triethylene glycol ethyl ether, or triethylene glycol butyl ether as the glycol ether solvent. Thus, the odor coming from the ink at the time of ink ejection has become a problem. Moreover, the disclosed one type of polyhydric alcohol, too, may cause degradation of response to an ejection frequency due to the dispersion of droplets by a shear force from a flow path, resulting from the high-speed operation of the head.

There has been proposed another ink for high-speed printing with improved ejection stability which is an ink using a specific surfactant (Japanese Unexamined Patent Application Publication Nos. 2008-184567 and 2007-197675). However, the corresponding surfactants may cause contamination in the flow path of the ink jet head. Thus, with an increase in ejection driving frequency, the dispersion of droplets may increase and the ink may cause excessive wettability against a head nozzle surface, thereby bringing about some problems in the high-speed printing ink.

As for inks for a thermal-bubble ink jet capable of high-speed printing, there was proposed an ink containing water as a main component and a glycol humectant mixed with the water for the purpose of suppressing ink from drying on a nozzle surface (Japanese Unexamined Patent Application Publication Nos. 1996-157758 and 2004-300280). However, the maximum ejection frequency was about 15 kHz, and thus the frequency response characteristic was suboptimal.

SUMMARY OF THE INVENTION

An aspect of the present invention provides a nonaqueous ink composition for an ink jet, which has excellent print quality and is capable of high-speed printing, and a method of manufacturing ink comprising the same.

According to an aspect of the present invention, there is provided a nonaqueous ink composition for an ink jet, including: a glycol ether acetate solvent represented by the following chemical formula (1); and a polypropylene glycol binder represented by the following chemical formula (2):

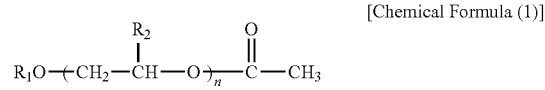

[Chemical Formula (1)]

where n is an integer of 1 or 2, $R_1$ is alkyl or aryl having 1 to 7 carbon atoms, and $R_2$ is hydrogen or methyl;

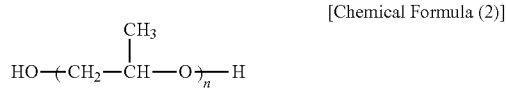

[Chemical Formula (2)]

where n is an integer of 3 or more.

The polypropylene glycol binder may include two or more types of binders having different molecular weights.

The average molecular weight of the polypropylene glycol binder may be 300 to 2,000 g/mol.

The hydroxyl number of polypropylene glycol binder may be 60 to 300.

The difference in average molecular weight between the two or more types of polypropylene binders may be 25 to 1700 g/mol.

The mixing viscosity of the two or more types of polypropylene binders may be 85 cP or less, and the average hydroxyl number thereof may be 230 or greater.

$R_1$ may be $CH_3$, $CH_2CH_3$, $CH_3(CH_2)_2$, $CH_3(CH_2)_3$, $CH(CH_3)_2$, $C(CH_3)_3$, or $C_6H_5$.

The glycol ether acetate solvent may be at least one selected from the group consisting of ethylene glycol ether acetates and propylene glycol ether acetates.

The content of the glycol ether acetate solvent may be 30 to 70 parts by weight with respect to 100 parts by weight of the composition.

The content of the polypropylene glycol binder may be 40 to 70 parts by weight with respect to 100 parts by weight of the composition.

The nonaqueous ink composition for the ink jet may include a triarylmethane dye represented by the following chemical formula (3):

[Chemical Formula (3)]

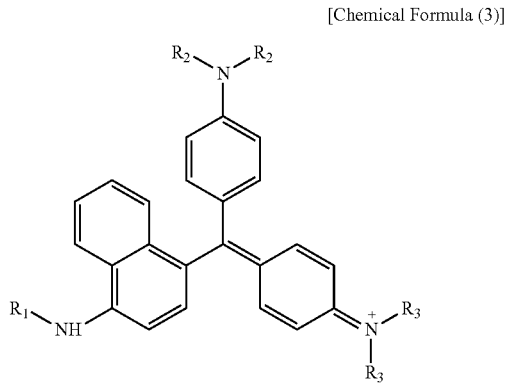

where $R_1$ is an alkyl or aryl group having 1 to 3 carbon atoms, and $R_2$ and $R_3$ are independently hydrogen or alkyl having 1 to 3 carbon atoms.

The content of the triarylmethane dye may be 0.1 to 1 part by weight with respect to 100 parts by weight of the composition.

The nonaqueous ink composition for the ink jet may further include at least one of an antioxidant agent and an ultraviolet absorber.

According to another aspect of the present invention, there is provided a method for manufacturing nonaqueous ink for an ink jet, including the steps of: dissolving the glycol ether acetate solvent represented by the following chemical formula (1) and the following chemical formula (2); adding a triarylmethane dye represented by the following chemical formula (3) in the dissolved material and solubilizing the triarylmethane dye; and filtering the dissolved material containing the dye with a filter:

[Chemical Formula (1)]

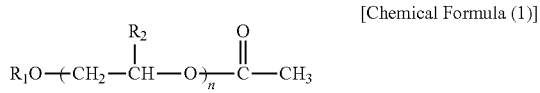

where n is an integer of 1 or 2, $R_1$ is alkyl or aryl having 1 to 7 carbon atoms, and $R_2$ is hydrogen or methyl,

[Chemical Formula (2)]

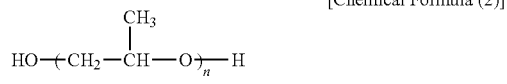

where n is an integer of 3 or more,

[Chemical Formula (3)]

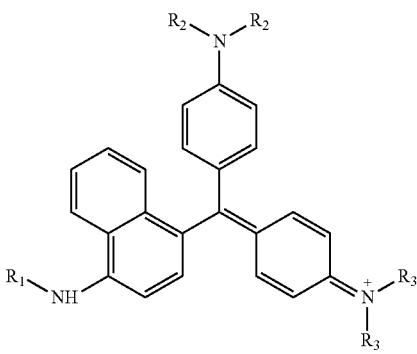

where $R_1$ is an alkyl or aryl group having 1 to 3 carbon atoms, and $R_2$ and $R_3$ are independently hydrogen or alkyl having 1 to 3 carbon atoms.

The polypropylene glycol binder may include two or more types of binders having different molecular weights.

The nonaqueous ink composition for the ink jet according to the present invention includes: a glycol ether acetate solvent represented by a specific chemical formula; and a polypropylene glycol binder represented by a specific chemical formula, and does not cause the dispersion of droplets or a satellite even in a high ejection frequency due to dynamic viscoelasticity obtained by a chemical interaction between the solvent and the binder.

Moreover, an extremely small amount of bubbles are produced due to a structural similarity between the chemicals of the solvent and the binder, and ejection stability at a high frequency band is ensured, thereby achieving high-speed and high-quality print quality.

DETAILED DESCRIPTION OF THE PREFERRED EMBODIMENT

The present invention relates to a nonaqueous ink composition for an ink jet, comprising: a glycol ether acetate solvent represented by the following chemical formula (1); and a polypropylene glycol binder represented by the following chemical formula (2):

[Chemical Formula (1)]

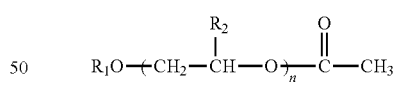

where n is an integer of 1 or 2, $R_1$ is alkyl or aryl having 1 to 7 carbon atoms, and $R_2$ is hydrogen or methyl,

[Chemical Formula (2)]

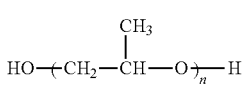

where n is an integer of 3 or more.

The nonaqueous ink composition for the ink jet according to the present invention does not cause the dispersion of droplets or a satellite, even in a high ejection frequency band, due to dynamic viscoelasticity obtained by a chemical interaction.

Moreover, bubbles generated in ink are deaerated within a short time without using an antifoaming agent, and hence the amount of residual bubbles within an ink flow path is very small, thus reducing the fall-out of a head nozzle due to the bubbles at the time of ink ejection.

Hereinafter, each component of the nonaqueous ink composition for the ink jet according to the present invention will be described more concretely.

The nonaqueous ink composition for the ink jet according to the present invention comprises a glycol ether acetate, as a solvent, represented by the following chemical formula (1):

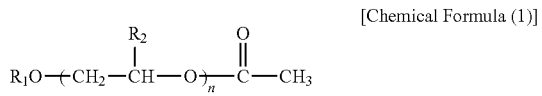

[Chemical Formula (1)]

where n is an integer of 1 or 2, $R_1$ is alkyl or aryl having 1 to 7 carbon atoms, and $R_2$ is hydrogen or methyl.

In the chemical formula (1), $R_1$ is alkyl or aryl having 1 to 7 carbon atoms, but is not limited thereto and may be, for example, $CH_3$, $CH_2CH_3$, $CH_3(CH_2)_2$, $CH_3(CH_2)_3$, $CH(CH_3)_2$, $C(CH_3)_3$, or $C_6H_5$.

Unlike polyhydric alcohol, it is difficult for the glycol ether acetate solvent to form a hydrogen bond between the molecules, hence the viscosity of the solvent is very low, thus making it easy to adjust the viscosity of the ink composition.

The glycol ether acetate solvent functions as a diluent, and has a relatively low surface tension. Accordingly, the glycol ether acetate solvent, along with a surfactant, improves the wettability between ink and a recording medium, and makes the ink to properly permeate into the nozzles to thus improve the ejection uniformity of each nozzle.

Moreover, the glycol ether acetate solvent has excellent solubilizing ability for the binder or additives, and may contain a high concentration of polypropylene glycol binder contained in the nonaqueous ink composition for the ink jet of the present invention. Accordingly, the glycol ether acetate solvent is suitable to provide dynamic viscoelasticity to the nonaqueous ink composition for the ink jet.

Furthermore, because the glycol ether acetate solvent is highly compatible with a polypropylene glycol binder, it does not cause the dispersion of droplets, even in a high ejection frequency band of the ink jet head and hence has an excellent ejection frequency response characteristic.

In addition, as stated above, the glycol ether acetate solvent can realize a surface tension appropriate for an ejection condition when combined with the polypropylene glycol binder due to the low surface tension of the solvent.

The glycol ether acetate solvent has a surface tension of 28 to 35 mN/m at 18 to 40° C. Therefore, when combined with a polypropylene glycol binder having a surface tension of 38 mN/m, a surface tension of 30 mN/m can be easily realized. Accordingly, ejection stability can be ensured in a high ejection frequency band without using a surfactant.

Besides, the glycol ether acetate solvent gives off less odor than a conventional glycol ether solvent, and thus exhibits excellent workability.

The glycol ether acetate solvent is not limited thereto, but may include, for example, ethylene glycol ether acetates and propylene glycol ether acetates. They may be used singularly or in combination with each other The ethylene glycol ether acetates are not limited thereto, but may include, for example, ethylene glycol monoethyl ether acetate, ethylene glycol monobutyl ether acetate, diethylene glycol monoethyl ether acetate, diethylene glycol monobutyl ether acetate, etc.

The propylene glycol ether acetates are not limited thereto, but may include, for example, propylene glycol monomethyl ether acetate, propylene glycol monoethyl ether acetate, propylene glycol monobutyl ether acetate, dipropylene glycol monomethyl ether acetate, dipropylene glycol monoethyl ether acetate, dipropylene glycol monobutyl ether acetate, etc.

The content of the glycol ether acetate solvent may be 30 to 70 parts by weight with respect to 100 parts by weight of the composition. If the content is less than 30 parts by weight, the viscosity of the ink composition may rise up to 15 cP. Therefore, there is a risk that, at the time of ink ejection, the initial ink priming characteristic of the head may be deteriorated and the droplet ejection speed become deteriorated, thereby having an adverse effect on the straightness of droplets. If the content exceeds 70 parts by weight, the viscosity may become too low and therefore may cause the dispersion of droplets in a high ejection frequency band.

The nonaqueous ink composition for the ink jet according to the present invention comprises a polypropylene glycol binder represented by the following chemical formula (2) in addition to the glycol ether acetate solvent:

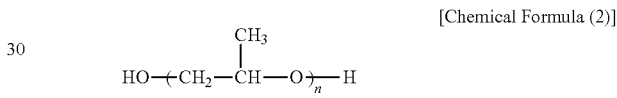

[Chemical Formula (2)]

where n is an integer of 3 or more.

The polypropylene glycol binder functions as a wetting additive for preventing the clogging of nozzles, and is an essential component for improving ejection stability in a high frequency band of the ink composition.

The polypropylene glycol binder forms chemical interactions (e.g., a hydrogen bond) between binders or with a glycol ether acetate solvent, thereby providing dynamic viscoelasticity to the ink composition and significantly improving the ejection frequency accordingly.

Moreover, the polypropylene glycol binder has a relatively high surface tension compared to that of the solvent. Therefore, when properly mixed with the solvent, a surface tension of 28 to 35 mN/m can be easily realized.

In general, polypropylene glycol is added to an aqueous or nonaqueous ink composition for an ink jet in order to improve the wettability of ink on the surface of a recording medium or prevent the clogging of the nozzles.

Polypropylene glycol has a very high solubility in water and has superior stability even at a high temperature, but the use amount thereof is restricted because its viscosity rises with an increase of the added amount.

However, in the present invention, polypropylene glycol is used together with a glycol ether acetate solvent, and the solvent has excellent solubilizing ability and compatibility to polypropylene glycol and may comprise a high concentration of polypropylene glycol binder. Accordingly, the dynamic viscoelasticity of the nonaqueous ink composition for the ink jet can be realized.

The polypropylene glycol binder may comprise two or more types of binders having different molecular weights. If two or more types of polypropylene glycol binders having different molecular weights are used, it may be easier to form chemical interactions (e.g., a hydrogen bond) between the binders or between the binder and the solvent. Accordingly, the ejection stability of droplets can be maintained even at a high frequency band of 20 kHz or greater, thus enabling high-speed printing.

The average molecular weight of the polypropylene glycol binder may be 300 to 2,000 g/mol and the hydroxyl number thereof may be 60 to 300.

The polypropylene glycol binder may comprise two or more types of binders having different molecular weights within the above range, and the smaller the difference in molecular weight, the higher the stability of droplets even in a high ejection frequency band. The difference in average molecular weight between the two or more types of polypropylene glycol binders may be 25 to 1,700 g/mol.

Moreover, the mixing viscosity of a mixture of two or more types of polypropylene glycol binders having different molecular weights may be 85 cP (25° C.) or less, and the average hydroxyl number thereof may be 230 or greater.

The content of the polypropylene glycol binder may be 40 to 70 parts by weight with respect to 100 parts by weight of the composition. If the content is less than 40 parts by weight, chemical interactions between the binders and with the solvent become weaker, and this may cause the dispersion of ink in a high ejection frequency band. If the content exceeds 70 parts by weight, the viscosity at ambient temperature becomes higher, and this may deteriorate the initial ink priming characteristic of the head and significantly lower the droplet ejection speed at the time of ink ejection.

The nonaqueous ink composition for the ink jet according to the present invention comprises a triarylmethane dye, as a colorant, represented by the following chemical formula (3) in addition to the above-described components:

[Chemical Formula (3)]

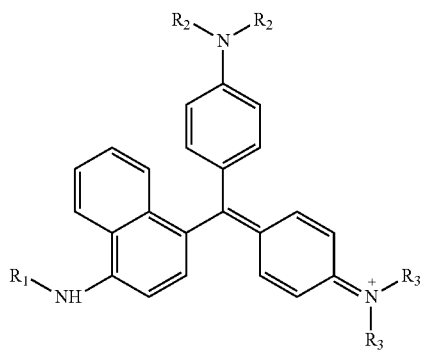

where $R_1$ is an alkyl or aryl group having 1 to 3 carbon atoms, and $R_2$ and $R_3$ are independently hydrogen or alkyl having 1 to 3 carbon atoms.

The triarylmethane dye is a chemical compound which produces a blue color, and exhibits superior coloration. The triarylmethane dye has excellent compatibility with the glycol ether acetate solvent and the polypropylene glycol binder included in the nonaqueous ink composition for the ink jet according to the present invention, and shows very low hygroscopic property.

Moreover, the triarylmethane dye causes less dispersion of droplets at a high frequency band compared to an equal amount of phthalocyanine dye, thus improving ejection stability.

The triarylmethane dye may show maximum absorbance at a wavelength of 550 to 650 nm but is not limited thereto, and may be, for example, C.I. basic blue 26 or C.I. basic blue 7.

The content of the triarylmethane dye may be 0.1 to 1 part by weight with respect to 100 parts by weight of the composition. If the content is less than 0.1 part by weight, the optical density of ink printed on an obtained image is low and the contrast of the image is weak, and the ejection frequency is deteriorated.

If the content exceeds 1 part by weight, it takes a long time to dissolve the dye, the viscosity of the ink composition becomes higher, and the ejection frequency is deteriorated.

Moreover, the nonaqueous ink composition for the ink jet according to the present invention may further comprise additives, such as an antioxidant agent and an ultraviolet absorber, in order to improve additional functions.

Examples of the antioxidant agent include a phenolic antioxidant containing a hindered phenol, an amine antioxidant, a sulfur antioxidant, and a phosphorous antioxidant.

Examples of the ultraviolet absorber include a benzophenone ultraviolet absorber, a benzotriazole ultraviolet absorber, a Salicylate ultraviolet absorber, a cyanoacrylate ultraviolet absorber and a nickel complex salt ultraviolet absorber.

Ink comprising the nonaqueous ink composition for the ink jet according to the present invention can be manufactured as follows.

The ink may be manufactured by the steps of dissolving the glycol ether acetate solvent represented by the chemical formula (1) and the chemical formula (2); adding a triarylmethane dye represented by the chemical formula (3) in the dissolved material and solubilizing the triarylmethane dye; and filtering the dissolved material containing the dye by a filter.

The filter is not limited thereto, but may be a filter having pores of 1 to 10 microns in size.

Detailed components and contents of the glycol ether acetate solvent represented by the chemical formula (1), the polypropylene glycol binder represented by the chemical formula (2), and the triarylmethane dye represented by the chemical formula (3) are as stated above.

The nonaqueous ink for the ink jet according to the present invention has very excellent storage stability, shows no change in the viscosity or surface tension of ink even after being placed in an oven at 40° C. for 12 weeks, and has no change in ejection stability at a high frequency band.

EXAMPLES

Hereinafter, the present invention will be described in more detail by way of examples; however, the present invention is not limited to these examples.

1. Ink Containing One Type of Polypropylene Glycol Binder

Example 1

To dipropylene glycol monomethyl ether acetate (DOWANOL DPMA, produced by DOW, 49.9% by weight), a polypropylene glycol A (PPZ, produced by SMC, MW=325, 49.9% by weight) binder was added, stirred, and dissolved. Afterwards, a C.I. basic blue 7 dye (0.2% by weight) was added thereto and completely dissolved for 8 hours, and then the prepared ink was filtered with a 1 μm-meshed Teflon membrane filter to manufacture ink.

Example 2

To dipropylene glycol monomethyl ether acetate (DOWANOL DPMA, produced by DOW, 49.9% by weight), a polypropylene glycol B (PPT, produced by SMC, MW=450, 49.9% by weight) binder was added, stirred, and dissolved. Afterwards, a C.I. basic blue 7 dye (0.2% by weight) was added thereto and completely dissolved for 8 hours, and then the prepared ink was filtered with a 1 μm-meshed Teflon membrane filter to manufacture ink.

Example 3

To dipropylene glycol monomethyl ether acetate (DOW-ANOL DPMA, produced by DOW, 49.9% by weight), a polypropylene glycol C (PPF, produced by SMC, MW=600, 49.9% by weight) binder was added, stirred, and dissolved. Afterwards, a C.I. basic blue 7 dye (0.2% by weight) was added thereto and completely dissolved for 8 hours, and then the prepared ink was filtered with a 1 μm-meshed Teflon membrane filter to manufactured ink.

Example 4

To dipropylene glycol monomethyl ether acetate (DOW-ANOL DPMA, produced by DOW, 49.9% by weight), a polypropylene glycol D (PPS, produced by SMC, MW=800, 49.9% by weight) binder was added, stirred, and dissolved. Afterwards, a C.I. basic blue 7 dye (0.2% by weight) was added thereto and completely dissolved for 8 hours, and then the prepared ink was filtered with a 1 μm-meshed Teflon membrane filter to manufacture ink.

Evaluation of Ink Compositions

The performance of the ink compositions manufactured in Examples 1 through 4 were evaluated according to the following performance evaluation methods.

1) Measurement of Ejection Frequency

A maximum ejection frequency at which a droplet dispersion or ejection abnormality in the same nozzle does not occur was measured under an ejection frequency sweep condition (the frequency is sequentially increased from 1 up to 30 kHz and the same ejection waveform is used) by using a SemJet system (equipped with 30-picoliter head and produced by Samsung Electro-Mechanics) which has a drop watcher mounted thereon and is able to instantaneously observe fine droplets at the time of ink ejection).

2) Measurement of Viscosity and Surface Tension

The viscosity was measured using a DV-II+viscometer (Brookfield Engineering, Inc.), and the surface tension was measured using a KRUSS bubble pressure tensiometer at a constant temperature of 25° C.

TABLE 1

| Sample | Binder | Viscosity (cP) | Surface tension (mN/m) | Maximum ejection frequency (kHz) |
|---|---|---|---|---|
| Example 1 | PPZ | 8.85 | 33.5 | 9 |
| Example 2 | PPT | 9.54 | 32.6 | 19 |
| Example 3 | PPF | 10.3 | 32.3 | 14 |
| Example 4 | PPS | 11.1 | 33.7 | 11 |

Referring to the above Table 1, Examples 1 to 4 showed their viscosity of no more than 15 cP, and showed their surface tension of about 30 mN/m which is appropriate for the ejection condition of ink for an ink jet.

Moreover, the maximum ejection frequency band is varied according to the molecular amount of the polypropylene glycol binder and the wettability to a recording medium is excellent.

2. Ink Containing Two Types of Polypropylene Glycol Binder

Example 5

To dipropylene glycol monomethyl ether acetate (DOWANOL DPMA, produced by DOW, 49.8% by weight), polypropylene glycol B (PPT, MW=450, 30% by weight) and polypropylene glycol C (PPF, MW=600, 20% by weight) were added, stirred, and dissolved. Afterwards, a C.I. basic blue 7 dye (0.2% by weight) was added thereto and completely dissolved for 8 hours, and then the prepared ink was filtered with a 1 μm-meshed Teflon membrane filter to manufacture ink.

Example 6

To dipropylene glycol, monomethyl ether acetate (DOWANOL DPMA, produced by DOW, 49.8% by weight), polypropylene glycol B (PPT, MW=450, 25% by weight) and polypropylene glycol C (PPF, MW=600, 25% by weight) were added, stirred, and dissolved. Afterwards, a C.I. basic blue 7 dye (0.2% by weight) was added thereto and completely dissolved for 8 hours, and then the prepared ink was filtered with a 1 μm-meshed Teflon membrane filter to manufacture ink.

Example 7

To dipropylene glycol monomethyl ether acetate (DOWANOL DPMA, produced by DOW, 49.8% by weight), polypropylene glycol B (PPT, MW=450, 20% by weight) and polypropylene glycol C (PPF, MW=600, 30% by weight) were added, stirred, and dissolved. Afterwards, a C.I. basic blue 7 dye (0.2% by weight) was added thereto and completely dissolved for 8 hours, and then the prepared ink was filtered with a 1 μm-meshed Teflon membrane filter to manufacture ink.

Example 8

To dipropylene glycol monomethyl ether acetate (DOWANOL DPMA, produced by DOW, 49.8% by weight), polypropylene glycol B (PPT, MW=450, 15% by weight) and polypropylene glycol C (PPF, MW=600, 35% by weight) were added, stirred, and dissolved. Afterwards, a C.I. basic blue 7 dye (0.2% by weight) was added thereto and completely dissolved for 8 hours, and then the prepared ink was filtered with a 1 μm-meshed Teflon membrane filter to manufacture ink.

The performance of the ink compositions manufactured in the above Examples 5 through 8 were evaluated according to the following performance evaluation methods and stated in Table 2.

TABLE 2

| Sample | Binder | Viscosity (cP) | Surface tension (mN/m) | Maximum ejection frequency (kHz) |
|---|---|---|---|---|
| Example 5 | PPT/PPF (6:4) | 9.62 | 33.8 | 30 |
| Example 6 | PPT/PPF (5:5) | 9.70 | 32.7 | 27 |
| Example 7 | PPT/PPF (4:6) | 9.83 | 34.1 | 19 |

TABLE 2-continued

| Sample | Binder | Viscosity (cP) | Surface tension (mN/m) | Maximum ejection frequency (kHz) |
|---|---|---|---|---|
| Example 8 | PPT/PPF (3:7) | 9.97 | 33.9 | 17 |

Referring to the above Table 2, Examples 5 to 8 demonstrated a viscosity of no more than 15 cP, and had a surface tension of about 30 mN/m, which is appropriate for the ejection condition of ink for an ink jet.

Moreover, the shape of droplets and the ejection frequency response characteristic were significantly enhanced.

It should be understood that the scope of the present invention is not limited by the foregoing embodiments and the accompanying drawings, but is defined by the claims that follow. Accordingly, those skilled in the art will appreciate that various substitutions, modifications and changes are possible, without departing from the technical spirit of the present invention as disclosed in the, accompanying claims, and such substitutions, modifications and changes are within the scope of the present invention.

What is claimed is:

1. A nonaqueous ink composition for an ink jet, comprising:
a glycol ether acetate solvent represented by the following chemical formula (1):

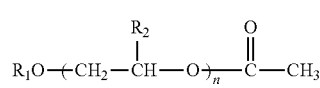

[Chemical Formula (1)]

where n is an integer of 1 or 2, $R_1$ is alkyl or aryl having 1 to 7 carbon atoms, and $R_2$ is hydrogen or methyl; and
a mixture of polypropylene glycols represented by the following chemical formula (2):

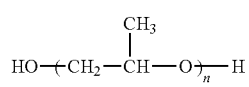

[Chemical Formula (2)]

where n is an integer of 3 or more,
the mixture of polypropylene glycols comprising two or more polypropylene glycols having different molecular weights,
a content of the glycol ether acetate solvent being 30 to 60% by weight with respect to the weight of the composition, and
a content of the mixture of polypropylene glycols being 40 to 70% by weight with respect to the weight of the composition.

2. The nonaqueous ink composition of claim 1, wherein the hydroxyl number of a mixture of polypropylene glycols is 60 to 300.

3. The nonaqueous ink composition of claim 1, wherein the mixing viscosity of the two or more polypropylene glycols is 85 cP or less.

4. The nonaqueous ink composition of claim 1, wherein $R_1$ is $CH_3$, $CH_2CH_3$, $CH_3(CH_2)_2$, $CH_3(CH_2)_3$, $CH(CH_3)_2$, $C(CH_3)_3$, or $C_6H_5$.

5. The nonaqueous ink composition of claim 1, wherein the glycol ether acetate solvent is at least one selected from the group consisting of ethylene glycol ether acetates and propylene glycol ether acetates.

6. The nonaqueous ink composition of claim 1, comprising a triarylmethane dye represented by the following chemical formula (3):

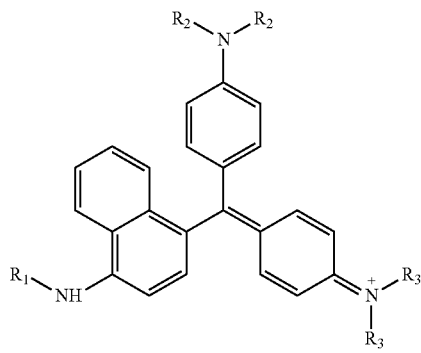

[Chemical Formula (3)]

where $R_1$ is an alkyl or aryl group having 1 to 3 carbon atoms, and $R_2$ and $R_3$ are independently hydrogen or alkyl having 1 to 3 carbon atoms.

7. The nonaqueous ink composition of claim 6, where the content of the triarylmethane dye is 0.1 to 1% by weight with respect to the weight of the composition.

8. The nonaqueous ink composition of claim 1, further comprising at least one of an antioxidant agent and an ultraviolet absorber.

9. A method for manufacturing nonaqueous ink for an ink jet, comprising:
dissolving the glycol ether acetate solvent represented by the following chemical formula (1) and the mixture of polypropylene glycols represented by the following chemical formula (2), the mixture of polypropylene glycols comprising two or more polypropylene glycols having different molecular weights:

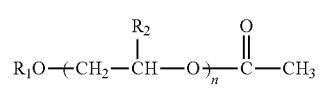

[Chemical Formula (1)]

where n is an integer of 1 or 2, $R_1$ is alkyl or aryl having 1 to 7 carbon atoms, and $R_2$ is hydrogen or methyl,

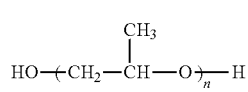

[Chemical Formula (2)]

where n is an integer of 3 or more;
adding a triarylmethane dye represented by the following chemical formula (3) in the dissolved material and solubilizing the triarylmethane dye:

[Chemical Formula (3)]

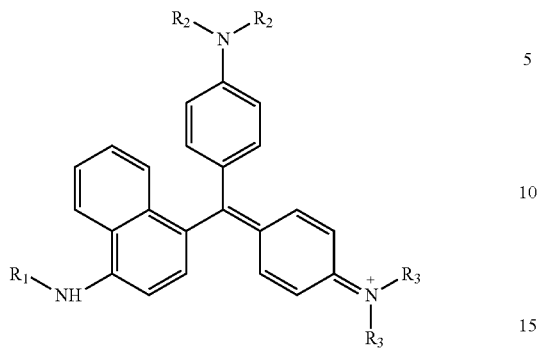

where $R_1$ is an alkyl or aryl group having 1 to 3 carbon atoms, and $R_2$ and $R_3$ are independently hydrogen or alkyl having 1 to 3 carbon atoms; and filtering the dissolved material containing the dye with a filter, a content of the glycol ether acetate solvent being 30 to 60 parts by weight with respect to the weight of the composition, and a content of the mixture of polypropylene glycols being 40 to 70% by weight with respect to the weight of the composition.

\* \* \* \* \*

UNITED STATES PATENT AND TRADEMARK OFFICE
CERTIFICATE OF CORRECTION

| | | |
|---|---|---|
| PATENT NO. | : 8,921,453 B2 | |
| APPLICATION NO. | : 12/656987 | |
| DATED | : December 30, 2014 | |
| INVENTOR(S) | : Jun Young Kim et al. | |

It is certified that error appears in the above-identified patent and that said Letters Patent is hereby corrected as shown below:

In the Claims

Column 13, line 23, in claim 9 after "30 to 60" delete "parts" and insert -- % --

Signed and Sealed this
Second Day of June, 2015

Michelle K. Lee
*Director of the United States Patent and Trademark Office*